US012447952B2

(12) United States Patent
Yamazaki

(10) Patent No.: US 12,447,952 B2
(45) Date of Patent: Oct. 21, 2025

(54) VEHICLE CONTROL APPARATUS FOR SYNCHRONIZING EVENT DATA

(71) Applicant: Honda Motor Co., Ltd., Tokyo (JP)

(72) Inventor: Etsuhiro Yamazaki, Tokyo (JP)

(73) Assignee: Honda Motor Co., Ltd., Tokyo (JP)

(*) Notice: Subject to any disclaimer, the term of this patent is extended or adjusted under 35 U.S.C. 154(b) by 103 days.

(21) Appl. No.: 18/444,974

(22) Filed: Feb. 19, 2024

(65) Prior Publication Data
US 2024/0308502 A1 Sep. 19, 2024

(51) Int. Cl.
B60W 40/00 (2006.01)
B60T 7/22 (2006.01)
B60W 30/09 (2012.01)

(52) U.S. Cl.
CPC .............. B60W 30/09 (2013.01); B60T 7/22 (2013.01); B60T 2201/022 (2013.01)

(58) Field of Classification Search
CPC ...... B60W 30/09; B60W 40/00; B60W 50/00; B60W 2050/0002; B60W 2050/0005; B60T 7/22; B60T 2201/022; G07C 5/0841
See application file for complete search history.

(56) References Cited

U.S. PATENT DOCUMENTS 10,102,696 B2* 10/2018 Iwaasa .................. B60W 50/08
2014/0297800 A1* 10/2014 Mutschler .............. H04L 67/10
709/217
2016/0212307 A1* 7/2016 Park ........................ H04N 23/73
2019/0069052 A1* 2/2019 Al-Stouhi ............... H04W 4/46
2019/0213290 A1* 7/2019 Delva ................. G01M 17/007
2020/0132738 A1* 4/2020 Assion ............... G01R 21/1331
2021/0382481 A1* 12/2021 Darayan ............... G05D 1/0238
2024/0308502 A1* 9/2024 Yamazaki ............. B60W 30/09

FOREIGN PATENT DOCUMENTS

CN 107235008 A * 10/2017 .............. B60R 1/00
JP 2000305955 A 11/2000
JP 2001034335 A 2/2001
KR 20240019524 A * 2/2024 ......... H04L 43/0852

* cited by examiner

Primary Examiner — Daniel M. Robert
(74) Attorney, Agent, or Firm — Duft & Bornsen, PC

(57) ABSTRACT

Vehicle control apparatus includes: detection unit including external sensor configured to detect external situation of vehicle; and control unit configured to control vehicle based on external situation detected by external sensor. Detection unit includes first processor and first memory. First processor counts first time, first time being elapsed time from predetermined time. First memory stores external situation and first time in association with each other. Control unit includes second processor and second memory. Second processor: calculates control value for controlling traveling actuator of vehicle based on external situation; and counts second time, second time being elapsed time from predetermined time. Second memory stores control value and second time in association with each other. Second processor transmits second time to detection unit at predetermined transmission cycle counted as second time. First processor replaces first time with second time transmitted from control unit and continues counting.

6 Claims, 2 Drawing Sheets

VEHICLE CONTROL APPARATUS FOR SYNCHRONIZING EVENT DATA

CROSS-REFERENCE TO RELATED APPLICATION

This application is based upon and claims the benefit of priority from Japanese Patent Application No. 2023-040418 filed on Mar. 15, 2023, the content of which is incorporated herein by reference.

BACKGROUND OF THE INVENTION

Field of the Invention

The present invention relates to a vehicle control apparatus that records information (event data) at the time when an accident occurs on a vehicle on which a driving support function such as a collision mitigation brake system is mounted.

Description of the Related Art

A plant control device configured to record event data has been conventionally known. For example, a device described in JP 2000-305955 A collects change points of an event signal and a synchronization signal as event data, also calculates a correction coefficient based on the event data of the synchronization signal, and corrects the time of the event data of the event signal based on the calculated correction coefficient. In a device described in JP 2001-034335 A, a high-resolution count value is added and collected as the event data at a change point of an event signal, in addition, the time is set as a reference time and the count value is set as a reference count value at the change point of a low-resolution time, and a difference between the count value of the event data and the reference count value is added to the reference time to generate an event time of the event data.

With the spread of vehicles each having the driving support function, the safety and convenience of the entire transportation society are improved, and a sustainable transportation system is achievable.

In the device described in JP 2000-305955 A and JP 2001-034335 A, however, arithmetic processing is needed to correct the time of the collected event data, and thus the configuration is complicated.

SUMMARY OF THE INVENTION

An aspect of the present invention is a vehicle control apparatus, including: a detection unit including an external sensor configured to detect an external situation of a vehicle; and a control unit configured to control the vehicle based on the external situation detected by the external sensor. The detection unit includes a first processor and a first memory coupled to the first processor. The first processor counts a first time, the first time being an elapsed time from a predetermined time. The first memory stores the external situation and the first time in association with each other. The control unit includes a second processor and a second memory coupled to the second processor. The second processor: calculates a control value for controlling a traveling actuator of the vehicle based on the external situation; and counts a second time, the second time being an elapsed time from the predetermined time. The second memory stores the control value and the second time in association with each other. The second processor transmits the second time to the detection unit at a predetermined transmission cycle counted as the second time. The first processor replaces the first time with the second time transmitted from the control unit and continues counting.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, embodiments of the present invention will be described with reference to FIGS. 1 to 3. A vehicle control apparatus according to an embodiment of the present invention is applied to a vehicle on which a driving support function such as a collision mitigation brake system (CMBS) is mounted, and records event data including operation information or the like of the driving support function when an accident occurs. Note that the "driving support" in the present embodiment includes driving support for supporting a driving operation by a driver and automatic driving for automatically driving a vehicle regardless of the driving operation by the driver, and corresponds to automatic driving of levels 1 to 4 defined by SAE, and the "automatic driving" corresponds to automatic driving of level 5.

In the driving support, a traveling actuator for a braking mechanism, a driving mechanism, or a steering mechanism or the like of the vehicle is controlled, based on a recognition result of an external situation in the surroundings of the vehicle by an external sensor such as a camera, thereby supporting avoidance of a collision, reduction of collision damage, and the like. Then, when a collision accident occurs, event data is recorded by each of in-vehicle units in accordance with operation information of an airbag, a rapid change, or the like in vehicle speed information (event data recorder (EDR)).

In the EDR, as the operation information of the driving support function, time-series event data is stored by a control unit that controls the traveling actuator, and in addition, the time-series event data is recorded by a detection unit including an external sensor that serves as the basis of the driving support. However, each of the in-vehicle units individually counts time by an individual clock unit. Hence, when a difference in counting the times between the units increases, it becomes difficult to accurately associate pieces of the event data with each other and accurately analyze the situation at the time when an accident occurs. Therefore, in the present embodiment, a vehicle control apparatus is configured as follows with a simple configuration, so that pieces of the event data can be synchronized in time with each other and the analysis accuracy of the situation at the time when an accident occurs can be improved.

Figure 1:
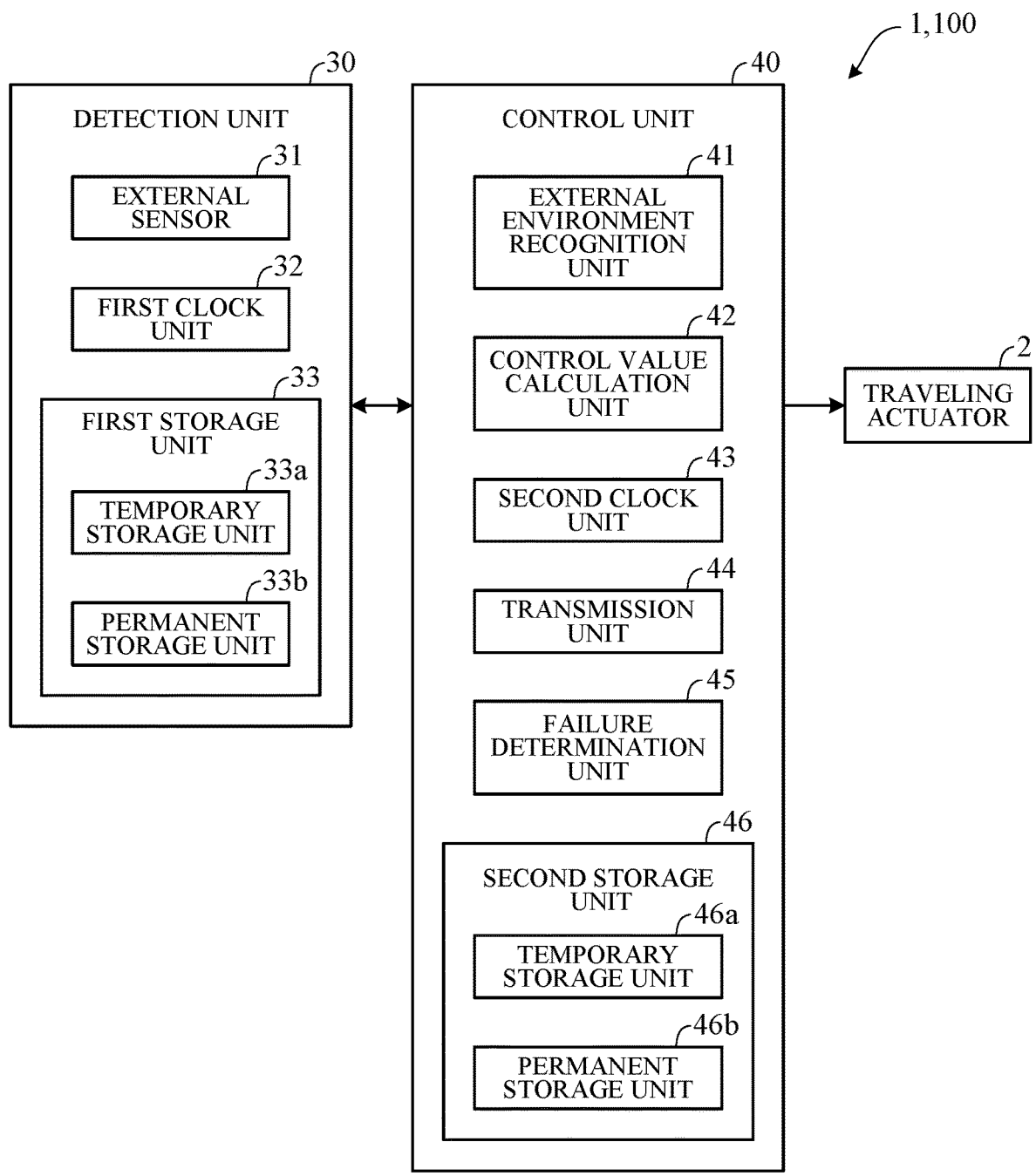
FIG. 1 is a block diagram schematically illustrating an example of a substantial configuration of a vehicle control apparatus according to an embodiment of the present invention.

FIG. 1 is a block diagram schematically illustrating an example of a substantial configuration of a vehicle control apparatus (hereinafter, an apparatus) 100 according to an embodiment of the present invention. As illustrated in FIG. 1, the apparatus 100 includes a traveling actuator 2, which is mounted on a vehicle 1, a detection unit 30, which includes an external sensor 31 for detecting an external situation of the vehicle 1, and a control unit 40, which controls the vehicle 1, based on the external situation that has been detected by the external sensor 31. The detection unit 30 and the control unit 40 are communicably connected with each other. The traveling actuator 2 is connected with the control unit 40.

The traveling actuator 2 includes a driving mechanism such as an engine or a motor that drives the vehicle 1, a braking mechanism such as a brake that applies the brakes on the vehicle 1, and a steering mechanism such as a steering gear that steers the vehicle 1.

The detection unit 30 includes the external sensor 31 and a computer including a CPU, a RAM, a ROM, an I/O interface, and other peripheral circuits. The detection unit 30 includes a first clock unit 32 and a first storage unit 33, as functional configurations of a computer. The CPU of the computer functions as the first clock unit 32, and the RAM and the ROM of the computer function as the first storage unit 33. The first storage unit 33 includes a temporary storage unit 33a corresponding to a functional configuration of the RAM, and a permanent storage unit 33b corresponding to a functional configuration of the ROM.

The external sensor 31 detects an external situation including a location of an object in a surrounding area of the vehicle 1. The external sensor 31 includes an imaging element such as a CCD or a CMOS, and includes a camera that images the surrounding area of the vehicle 1. The external sensor 31 may include a distance detection unit that detects a distance from the vehicle 1 to an object in the surrounding area. The distance detection unit includes, for example, a millimeter wave radar that irradiates a millimeter wave (a radio wave) and that measures a distance and a direction to an object from a time until the irradiated wave hits the object and returns. The distance detection unit may include a LiDAR that irradiates laser light and that measures a distance and a direction to an object from a time until the irradiated light hits the object and returns. An external situation is detected by the external sensor 31 at a predetermined detection cycle (for example, about 20 milliseconds). The external situation (detection data) that has been detected by the external sensor 31 is transmitted to the control unit 40.

The first clock unit 32 counts a first time t1, which is an elapsed time from a predetermined time. More specifically, when the apparatus 100 is activated and the detection unit 30 is activated, the first clock unit 32 starts counting the first time t1, which is the elapsed time from an activation time. Count (count up) of the first time t1 by the first clock unit 32 is made at a predetermined count cycle (for example, every one millisecond) that is sufficiently shorter than a detection cycle of the external sensor 31.

Detection data of the external situation that has been detected at a predetermined detection cycle by the external sensor 31 is associated with the first time t1, which has been counted at a predetermined count cycle by the first clock unit 32, and is stored in the temporary storage unit 33a of the first storage unit 33. When time-series detection data stored in the temporary storage unit 33a reaches a certain storage capacity, the detection data is sequentially overwritten with the latest detection data from the oldest detection data, and is lost. Alternatively, when the power supply to the detection unit 30 is stopped, the data is erased and lost.

The control unit 40 includes a computer including a CPU, a RAM, a ROM, an I/O interface, and other peripheral circuits. The control unit 40 includes, as functional configurations, an external environment recognition unit 41, a control value calculation unit 42, a second clock unit 43, a transmission unit 44, a failure determination unit 45, and a second storage unit 46. That is, the CPU functions as the external environment recognition unit 41, the control value calculation unit 42, the second clock unit 43, the transmission unit 44, and the failure determination unit 45, and the RAM and the ROM function as the second storage unit 46. The second storage unit 46 includes a temporary storage unit 46a corresponding to a functional configuration of the RAM and a permanent storage unit 46b corresponding to a functional configuration of the ROM.

The external environment recognition unit 41 recognizes an external situation of a surrounding area with an advancing direction of the vehicle 1 as the center, based on a signal from the external sensor 31. More specifically, positions of a division line, a curbstone, a guardrail, and the like on a road, are recognized, and a traveling lane on which the vehicle 1 is traveling is recognized. In addition, another vehicle, a pedestrian, an obstacle, or the like present in the surrounding area is recognized as a target object, and a distance from the vehicle 1 to each target object is recognized.

The control value calculation unit 42 calculates a control value for controlling the traveling actuator 2 of the vehicle 1, based on the external situation that has been recognized by the external environment recognition unit 41. For example, a control value (for example, a target steering angle, steering assist torque, or the like) for controlling the steering mechanism is calculated so that the vehicle 1 travels along the center of the travel lane that has been recognized by the external environment recognition unit 41. In addition, a control value (for example, a target engine speed, a brake pressure, or the like) for controlling the driving mechanism and the braking mechanism is calculated so that the vehicle 1 travels keeping a certain distance from a preceding vehicle that has been recognized by the external environment recognition unit 41. Further, the possibility of a collision is determined, based on the distance to another vehicle, a pedestrian, an obstacle, or the like present in the advancing direction of the vehicle 1 that has been recognized by the external environment recognition unit 41, and a control value for controlling the braking mechanism and the driving mechanism (alternatively or additionally, the steering mechanism) is calculated in accordance with a determination result. The control value calculation unit 42 calculates the control value at a predetermined calculation cycle (for example, about 10 milliseconds).

The second clock unit 43 counts a second time t2, which is an elapsed time from a predetermined time. More specifically, when the apparatus 100 is activated and the control unit 40 is activated, the second clock unit 43 starts counting a second time t2, which is an elapsed time from an activation time. Count (count up) of the second time t2 by the second clock unit 43 is made at a predetermined count cycle (for example, every one millisecond) that is sufficiently shorter than a calculation cycle of the control value calculation unit 42.

The control value that has been calculated at the predetermined calculation cycle by the control value calculation unit 42 is associated with the second time t2, which has been counted at the predetermined count cycle by the second clock unit 43, and is stored in the temporary storage unit 46*a* of the second storage unit 46. Note that the temporary storage unit 46*a* stores a recognition result of the external situation, a determination result of a collision possibility, and the like, in addition to the control value used for controlling the traveling actuator 2. When time-series control values stored in the temporary storage unit 46*a* reach a certain storage capacity, the control value is sequentially overwritten with the latest control value from the oldest detection data, and is lost. Alternatively, when the power supply to the control unit 40 is stopped, the data is erased and lost.

<Time Synchronization between Units>

Figure 2:
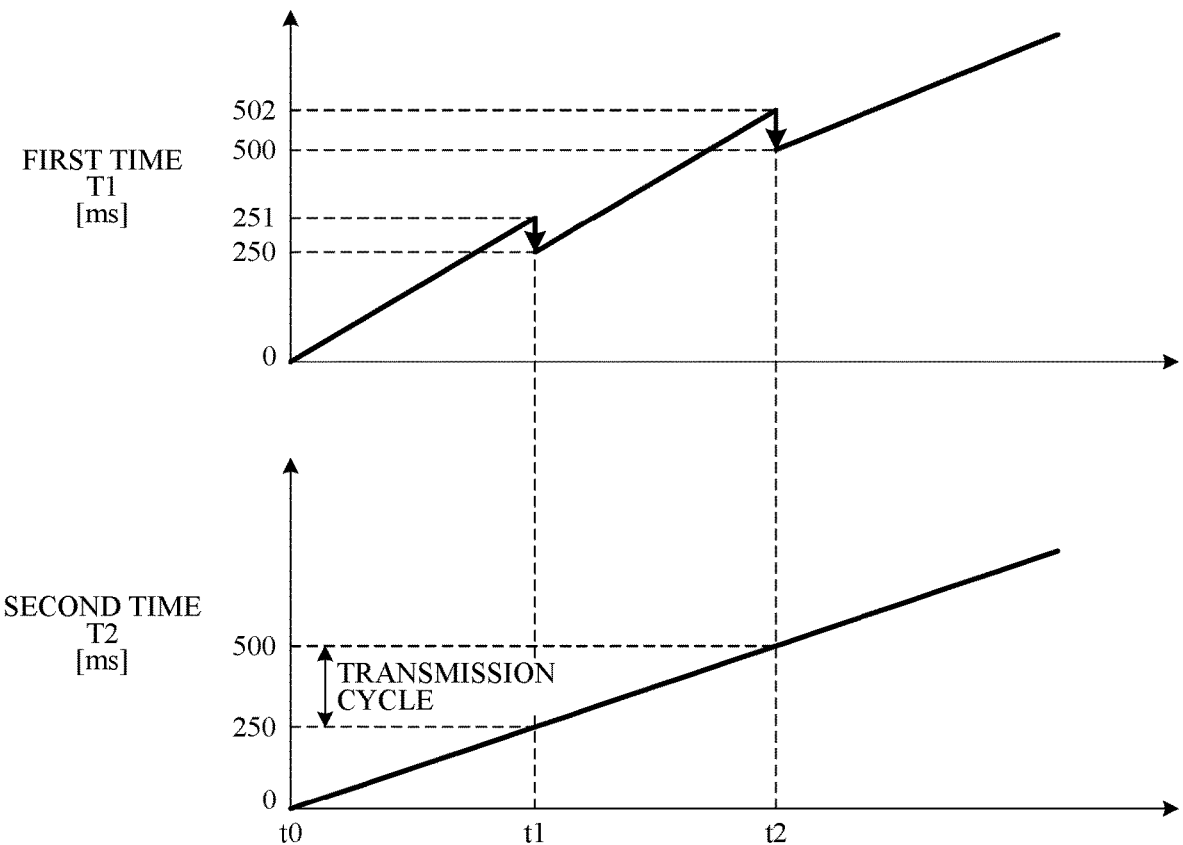
FIG. 2 illustrates time charts for describing synchronization between a first time counted by a first clock unit of FIG. 1 and a second time counted by a second clock unit of FIG. 1.

FIG. 2 illustrates time charts for describing synchronization between the first time t1 counted by the first clock unit 32 and the second time t2 counted by the second clock unit 43. As illustrated in FIG. 2, the transmission unit 44 of the control unit 40 (FIG. 1) transmits the second time t2 counted by the second clock unit 43 to the detection unit 30 at a predetermined transmission cycle (for example, 250 milliseconds). The transmission cycle in this case is a cycle in the second time t2 counted by the second clock unit 43, and is counted as the second time t2.

More specifically, after the apparatus 100 and each of the units 30 and 40 are activated at time t0, when the second time t2 counted by the second clock unit 43 reaches the transmission cycle at time t1, the transmission unit 44 transmits the second time t2 (250 milliseconds in the example of FIG. 2) to the detection unit 30. In addition, after the second time t2 is transmitted to the detection unit 30 at time t1, when the second time t2 counted by the second clock unit 43 reaches the transmission cycle at time t2, the second time t2 (500 milliseconds in the example of FIG. 2) is transmitted to the detection unit 30.

The first clock unit 32 of the detection unit 30 (FIG. 1) replaces the first time t1 with the second time t2, which has been transmitted by the transmission unit 44 of the control unit 40, and continues counting. More specifically, when receiving the second time t2 at time t1, the first clock unit 32 replaces (synchronizes) a counted value (251 milliseconds in the example of FIG. 2) of the first time t1, which has been counted (counted up) from time t0 to time t1, with the received second time (250 milliseconds in the example of FIG. 2). Then, from time t1 to time t2, by counting up the first time t1 (250 milliseconds in the example of FIG. 2) synchronized at time t1, counting the first time t1 continues. Similarly, when the second time t2 is received at time t2, synchronization for the second time is performed by replacing the counted value (502 milliseconds in the example of FIG. 2) of the first time t1, which has been counted from time t1 to time t2, with the received second time (500 milliseconds in the example of FIG. 2). Then, from time t2 to synchronization for the next time, by counting up the first time t1 (500 milliseconds in the example of FIG. 2) synchronized at time t2, counting the first time t1 continues.

In this manner, in the synchronization between the first time t1 on the detection unit 30 side and the second time t2 on the control unit 40 side, the counted value is simply transmitted, received, and replaced, so that an arithmetic load of each of the units 30 and 40 due to the synchronization processing can be suppressed to an extremely small value.

In addition, by appropriately synchronizing the first time t1 on the detection unit 30 side with the second time t2 on the control unit 40 side, the recognition accuracy of the external situation on the control unit 40 side can be improved. That is, the detection unit 30 includes a plurality of camera units including each of the stereo cameras being as the external sensor 31, in some cases. Alternatively, a camera unit including a monocular camera as the external sensor 31 and a radar unit including a millimeter wave radar as the external sensor 31 are included, in some cases. In such cases, the control unit 40 recognizes the external situation by performing sensor fusion of pieces of the detection data received from the respective detection units 30. Therefore, the time synchronization between the respective detection unit 30 and the control unit 40 is performed appropriately, so that the recognition accuracy of the external situation can be improved.

<Recording of Event Data>

Figure 3:
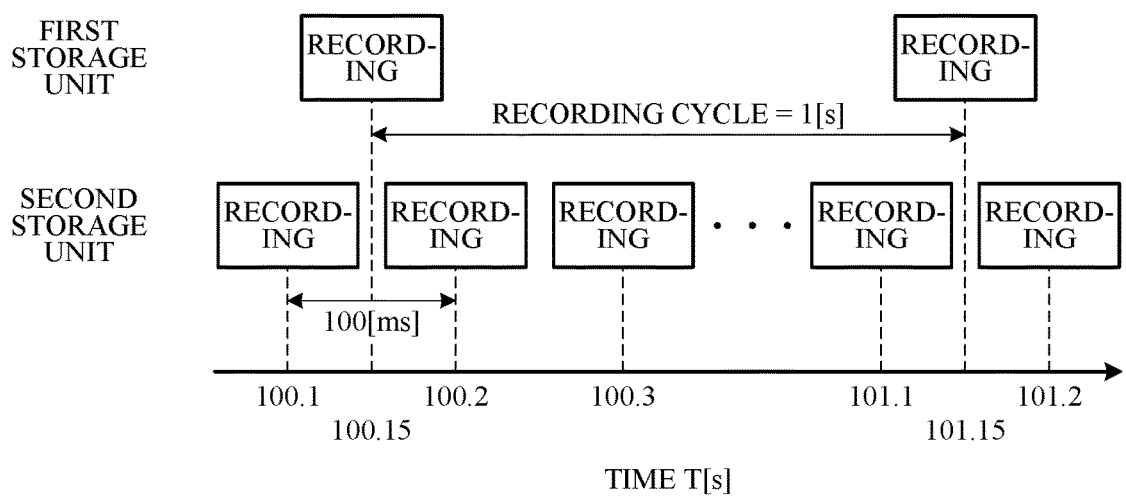
FIG. 3 is a time chart for describing a recording cycle of recording event data in permanent storage units of FIG. 1.

FIG. 3 is a time chart for describing a recording cycle of recording event data in the permanent storage units 33*b* and 46*b* of the respective units 30 and 40 (FIG. 1). In the EDR, when a predetermined event such as a collision accident occurs, the control unit 40 that controls the traveling actuator 2 is instructed to record event data in accordance with the operation information of the airbag or the rapid change in the vehicle speed information. For example, a record command of recording the event data is transmitted from an in-vehicle unit, not illustrated, that controls the airbag to the control unit 40. When receiving the record command of recording the event data, the transmission unit 44 of the control unit 40 transmits (transfers) the record command of recording the event data to the detection unit 30.

When recording the event data is instructed, in the control unit 40, all or a part of the time-series control values stored in the temporary storage unit 46*a* of the second storage unit 46 is recorded in the permanent storage unit 46*b* of the second storage unit 46. The control value recorded in the permanent storage unit 46*b* is held also after the power supply to the control unit 40 is stopped.

More specifically, as illustrated in FIG. 3, among the time-series (for example, 10 millisecond cycle) control values in a predetermined period before and after an occurrence of an event stored in the temporary storage unit 46*a*, the time-series control value in every predetermined recording cycle (for example, 100 milliseconds) is extracted and recorded in the permanent storage unit 46*b*. The recording cycle in this case is a cycle in the second time t2 counted by the second clock unit 43, and is counted as the second time t2. In other words, as the event data of the control unit 40, the permanent storage unit 46*b* stores the control value that has been calculated by the control value calculation unit 42 and the second time t2 that has been counted by the second clock unit 43 in association with each other at a predetermined recording cycle that has been counted by the second clock unit 43. Note that the event data includes a recognition result of the external situation, a determination result of the collision possibility, and the like, in addition to the control value used for controlling the traveling actuator 2.

When the record command of recording the event data is transmitted (transferred) from the control unit 40 to the detection unit 30, all or a part of the time-series detection data stored in the temporary storage unit 33*a* of the first storage unit 33 is recorded in the permanent storage unit 33*b* of the first storage unit 33, in the detection unit 30. The detection data recorded in the permanent storage unit 33*b* is held, also after the power supply to the detection unit 30 is stopped.

More specifically, as illustrated in FIG. 3, among the time-series (for example, 20 millisecond cycle) detection data in a predetermined period before and after an occurrence of an event stored in the temporary storage unit 33*a*, the time-series detection data in every predetermined recording cycle (for example, one second) is extracted and recorded in the permanent storage unit 33b. The recording cycle in this case is a cycle in the first time t1 counted by the first clock unit 32, and is counted as the first time t1. In other words, as the event data of the detection unit 30, the permanent storage unit 33b stores the detection data that has been detected by the external sensor 31 and the first time t1 that has been counted by the first clock unit 32 in association with each other at a predetermined recording cycle that has been counted by the first clock unit 32.

In this manner, the recording cycle (for example, one second) of recording the event data on the detection unit 30 side in the permanent storage unit 33b is set to a cycle sufficiently longer than the transmission cycle (for example, 250 milliseconds) of performing the synchronization between the detection unit 30 and the control unit 40. Accordingly, a difference between the first time t1 of the event data on the detection unit 30 side and the second time t2 of the event data on the control unit 40 side is made sufficiently small, and pieces of the event data are accurately associated with each other, so that the analysis accuracy of the situation at the time when an accident occurs can be improved.

<Failure Determination>

When a failure such as a communication failure between the control unit 40 and the detection unit 30 or an abnormality of the detection unit 30 occurs, it becomes difficult for the control unit 40 side to appropriately conduct vehicle control based on an external situation. Therefore, when such a failure occurs, the apparatus 100 transitions the vehicle 1 to a safe state, by performing, for example, vehicle speed limitation or the like. More specifically, a failure determination is made in a predetermined determination cycle (for example, two seconds) with an allowable time (a fault tolerant time interval (FTTI)) from the occurrence of the failure to the transition to the safe state. When it is decided that the failure has occurred, the vehicle 1 is transitioned to the safe state.

The failure determination unit 45 of the control unit 40 (FIG. 1) communicates with the detection unit 30 at a predetermined determination cycle (for example, two seconds), and makes a failure determination by verifying the first time t1 stored in the first storage unit 33. The determination cycle in this case is a cycle in the second time t2 counted by the second clock unit 43, and is counted as the second time t2. More specifically, the failure determination is made by determining whether the communication between the control unit 40 and the detection unit 30 is normally performed, and in a case where the communication is normally performed, by further determining whether counting (including synchronization) by the first clock unit 32 is normally performed. In a case where the time synchronization between the detection unit 30 and the control unit 40 to be performed a plurality of times (for example, two seconds/250 milliseconds=eight times) in one determination cycle has all failed, the failure determination unit 45 determines that a failure has occurred.

Here, a transmission cycle (for example, 250 milliseconds) of performing the time synchronization and a recording cycle (for example, one second) of recording the event data in the first storage unit 33 (the permanent storage unit 33b) of the detection unit 30 are both set to cycles sufficiently shorter than the determination cycle (for example, two seconds). In a case where the failure determination unit 45 determines that the communication between the control unit 40 and the detection unit 30 is normally performed, for example, even only once in one determination cycle, and the counting the time by the first clock unit 32 is normally performed, the occurrence of the failure is not decided, and the vehicle 1 is not transitioned to the safe state. Therefore, it is possible to reduce a possibility that a failure is decided due to a temporary communication error, a synchronization error, or the like and transition to the safe state is made unnecessarily.

According to the present embodiment, the following operations and effects are achievable.

(1) The apparatus 100 includes the detection unit 30 including the external sensor 31 that detects an external situation of the vehicle 1, and the control unit 40 that controls the vehicle 1, based on the external situation that has been detected by the external sensor 31 (FIG. 1). The detection unit 30 includes the first clock unit 32 that counts the first time t1, which is an elapsed time from a predetermined time (for example, the activation time of the apparatus 100), and the first storage unit 33 that stores the external situation that has been detected by the external sensor 31 and the first time t1 counted by the first clock unit 32 in association with each other. The control unit 40 includes the control value calculation unit 42 that calculates a control value for controlling the traveling actuator 2 of the vehicle 1, based on the external situation that has been detected by the external sensor 31, the second clock unit 43 that counts the second time t2, which is an elapsed time from a predetermined time, the second storage unit 46 that stores the control value that has been calculated by the control value calculation unit 42 and the second time t2 counted by the second clock unit 43 in association with each other, and the transmission unit 44 that transmits the second time t2 counted by the second clock unit 43 to the detection unit 30 at a predetermined transmission cycle that has been counted by the second clock unit 43. The first clock unit 32 replaces the first time t1 with the second time t2 that has been transmitted by the transmission unit 44, and continues counting (FIG. 2). Accordingly, with a simple configuration, the first time t1 and the second time t2 are synchronized with each other, and the event data on the detection unit 30 side and the event data on the control unit 40 side are accurately associated with each other, so that the analysis accuracy of the situation at the time when an accident occurs can be improved.

(2) The permanent storage unit 33b of the first storage unit 33 stores the external situation that has been detected by the external sensor 31 and the first time t1 counted by the first clock unit 32 in a predetermined recording cycle (for example, one second) longer than the transmission cycle (for example, 250 milliseconds) that has been counted by the first clock unit 32. That is, the recording cycle (for example, one second) of recording the event data on the detection unit 30 side in the permanent storage unit 33b is set to a cycle sufficiently longer than a transmission cycle (for example, 250 milliseconds) of performing the synchronization between the detection unit 30 and the control unit 40. Accordingly, it becomes possible to sufficiently reduce the difference between the first time t1 of the event data on the detection unit 30 side and the second time t2 of the event data on the control unit 40 side.

(3) The control unit 40 further includes the failure determination unit 45 that determines whether communication between the control unit 40 and the detection unit 30 or counting by the first clock unit 32 is normally performed in a predetermined determination cycle (for example, two seconds) longer than the transmission cycle (for example, 250 milliseconds) that has been counted by the second clock unit 43 (FIG. 1). By setting the transmission cycle (for example, 250 milliseconds) of performing the synchronization between the detection unit 30 and the control unit 40 to a cycle sufficiently shorter than the determination cycle (for example, two seconds), it is possible to reduce a possibility that a failure is decided due to a temporary error and the transition to the safe state is made unnecessarily.

(4) The determination cycle (for example, two seconds) is longer than the recording cycle (for example, one second) of recording the event data on the detection unit 30 side. By setting the recording cycle (for example, one second) of recording the event data on the detection unit 30 side to a cycle sufficiently shorter than the determination cycle (for example, two seconds), it becomes possible to reduce the possibility that the failure is decided due to a temporary error and the transition to the safe state is made unnecessarily.

The above embodiment can be combined as desired with one or more of the aforesaid modifications. The modifications can also be combined with one another.

According to the present invention, pieces of the event data can be synchronized in time with each other with a simple configuration.

Above, while the present invention has been described with reference to the preferred embodiments thereof, it will be understood, by those skilled in the art, that various changes and modifications may be made thereto without departing from the scope of the appended claims.

The invention claimed is:

1. A vehicle control apparatus, comprising:
a detection unit including an external sensor configured to detect an external situation of a vehicle; and
a control unit configured to control the vehicle based on the external situation detected by the external sensor, wherein
the detection unit includes a first processor and a first memory coupled to the first processor, wherein
the first processor counts a first time, the first time being an elapsed time from a predetermined time, wherein
the first memory stores the external situation and the first time in association with each other, wherein
the control unit includes a second processor and a second memory coupled to the second processor, wherein
the second processor:
calculates a control value for controlling a traveling actuator of the vehicle based on the external situation; and
counts a second time, the second time being an elapsed time from the predetermined time, wherein
the second memory stores the control value and the second time in association with each other, wherein
the second processor transmits the second time to the detection unit at a predetermined transmission cycle counted as the second time, wherein
the first processor replaces the first time with the second time transmitted from the control unit and continues counting.

2. The vehicle control apparatus according to claim 1, wherein
the first memory stores the external situation and the first time in association with each other in a predetermined recording cycle longer than the transmission cycle counted by the first processor.

3. The vehicle control apparatus according to claim 1, wherein
the second processor determines whether communication between the control unit and the detection unit or counting by the first processor is normally performed in a predetermined determination cycle longer than the transmission cycle counted as the second time.

4. The vehicle control apparatus according to claim 3, wherein
the determination cycle is longer than the recording cycle.

5. The vehicle control apparatus according to claim 1, wherein
the detection unit and the control unit are activated at the predetermined time.

6. The vehicle control apparatus according to claim 2, wherein
the recording cycle is a first recording cycle, wherein
when the control unit receives a record command of recording event data, the second processor transmits the record command to the detection unit, wherein
when the control unit receives the record command, the second memory stores the control value and the second time in association with each other as the event data of the control unit in a second recording cycle counted as the second time, wherein
when the detection unit receives the record command, the first memory stores the external situation and the first time in association with each other as the event data of the detection unit in a first recording cycle counted as the first time.

* * * * *